(12) United States Patent
Zafiroglu et al.

(10) Patent No.: US 11,725,321 B2
(45) Date of Patent: Aug. 15, 2023

(54) STABILIZATION OF SLIT ABSORBENT FABRIC EDGES

(71) Applicant: Xymid, LLC., Midlothian, VA (US)

(72) Inventors: Dimitri Zafiroglu, Centreville, DE (US); Jason Billups, Northern Chesterfield, VA (US)

(73) Assignee: Xymid, LLC., Midlothian, VA (US)

( * ) Notice: Subject to any disclaimer, the term of this patent is extended or adjusted under 35 U.S.C. 154(b) by 23 days.

(21) Appl. No.: 17/222,363

(22) Filed: Apr. 5, 2021

(65) Prior Publication Data

US 2021/0310169 A1    Oct. 7, 2021

Related U.S. Application Data

(60) Provisional application No. 63/004,619, filed on Apr. 3, 2020.

(51) Int. Cl.
| | |
|---|---|
| *B29C 59/02* | (2006.01) |
| *B29C 59/04* | (2006.01) |
| *D02G 3/24* | (2006.01) |
| *D02J 13/00* | (2006.01) |
| *D06H 5/00* | (2006.01) |
| *D06C 25/00* | (2006.01) |
| *D06C 7/00* | (2006.01) |
| *B29C 43/22* | (2006.01) |
| *D04H 1/55* | (2012.01) |
| *D04H 1/54* | (2012.01) |

(52) U.S. Cl.
CPC .......... *D06C 25/00* (2013.01); *B29C 43/222* (2013.01); *D02J 13/005* (2013.01); *D04H 1/54* (2013.01); *D04H 1/55* (2013.01); *D06C 7/00* (2013.01); *D06C 2700/16* (2013.01); *D06C 2700/17* (2013.01); *D10B 2201/20* (2013.01)

(58) Field of Classification Search
CPC . B29C 59/02; B29C 59/04; D02G 3/24; D02J 13/00; D06C 7/00; D06C 25/00; D06H 5/00
USPC ........... 264/160, 280, 284, 342 RE; 156/88; 428/192, 193
See application file for complete search history.

(56) References Cited

U.S. PATENT DOCUMENTS

2005/0148964 A1* 7/2005 Chambers, Jr. ........ A61F 13/534
604/367

FOREIGN PATENT DOCUMENTS

JP    2013147762 A * 8/2013    ............... D03D 1/00

* cited by examiner

*Primary Examiner* — Leo B Tentoni
(74) *Attorney, Agent, or Firm* — The H.T. Than Law Group

(57) ABSTRACT

Disclosed are the cut edges of an absorbent fabric comprising at least 45% and less than about 90% cellulosic or natural fibers, and a fusible component being stabilized by fusing the fusible component with an arrangement of spaced lines or spaced areas extending from the cut edges, and optionally over the entire absorbent fabric.

23 Claims, 13 Drawing Sheets

STABILIZATION OF SLIT ABSORBENT FABRIC EDGES

FIELD OF THE INVENTION

The present invention relates to a textile application of creating an absorbent, launderable, and re-useable fabric containing high natural of cellulosic fibers, e.g., more than 45% cellulosic fibers, that requires slitting or cutting in a manner that minimizes or preferably prevents the cut or slit edges' tendency to unravel or fuzz during normal and higher than normal use and/or laundering.

BACKGROUND OF THE INVENTION

Absorbent fabrics containing natural fibers are favored in household and industrial cleaning works. Natural fibers are hydrophilic and naturally wick liquids from spills or cleaning liquids sprayed on soiled surfaces. They also have good hand feels and are washable. However, due to their natural fiber content, after these absorbent fabrics are cut or slit into usable sizes it is difficult to maintain the shape of the cut edges during their expected service life. Conventional sealing machines such as ultrasonic welding machines generally cannot satisfactorily seal the cut edges due to the high cellulosic fiber content. Ultrasound vibrates and melts polymeric fibers and materials, but cannot melt natural fibers such as cellulose, cotton and wool, etc. Even when ultrasonic sealing can seal cut edges sufficiently, it continues to create substantially stiff margins precipitously changing from the compressed and thinned margins to the thicker absorbent center. This is objectionable in applications such as wipes, towels, and loose apparels, where the cut edges are subjected to repeated washing and drying under relatively harsh conditions that can cause warping or rippling of the margins and abrading by friction at the hardened fused areas around the ultrasonically bonded spots or lines. Stiff cut edges can also interfere with wiping.

Kitchen and restaurant towels are typically made from absorbent fabrics with the edges sewn together with threads or yarns to prevent unraveling and/or fuzzing. However, edge-sewing around the corners of a rectangular towel is a particularly difficult production step that adds to the costs. A further problem is that a sewn edge may resist subsequent edge length adjustment if the fabric has a tendency to shrink when laundered, causing rippled edges.

One particular problem occurs when cellulosic substrates are stitch-bonded with thermoplastic yarns that include exposed underlaps of laid-in or stitched-in tricot stitches. The underlaps when cross-cut along the edges tend to unravel during use or during washing and drying. Melting the underlaps within a small distance along the cut edges can also cause hardening of the edges, excessive loss of local thickness and absorptivity, and loss of capability to dimensionally adjust for washing and drying shrinkage and avoid curling along the cut edges.

There remains a need for stabilizing fabrics at the edges or throughout the fabrics, and a manufacturing method that can provide edge stability and preserve softness, bulk, absorbency and drapeability of bulky fabrics, and in particular bulky fabrics containing a large percentage of cellulosic fibers by stabilizing co-woven or co-knit or over-stitched yarns, when the fabric is slit, cut or trimmed without subsequent edge sewing. Furthermore, it is desirable that the fabrics maintain integral and flat edges after multiple washings and dryings. It is further desirable that highly cellulosic fabrics can be stabilized in a manner that allows cutting into towels or wipes, or into irregularly shaped parts for garments or other uses of any shape or size, without leaving cut edges unable to withstand abrasion or washing and drying. It is also desirable that the stabilization maintains most or all of the bulk and absorptive capacity of the original fabrics.

SUMMARY OF THE INVENTION

These and other objects of the present invention are realized by a non-limiting embodiment of the present invention, which relates to a method or process for stabilizing the cut edges of an absorbent fabric, containing at least about 45%, preferably at least about 55%, preferably at least about 70% and less than about 90% cellulosic or natural component/fibers, and a fusible component present or added at least within a margin along the cut edges. The inventive process comprises the steps of (i) intermittently fusing said margin by applying heat and pressure to said margin to melt the fusible component in discrete fused areas extending at least along, across or at an angle to the cut edges, and (ii) maintaining free areas between the discrete fused areas substantially free of fusing, (iii) wherein said margins optionally extend over substantially the entire surface of the fabric, (iv) wherein the discrete fused areas comprise less than about 33%, preferably less than about 30%, preferably less than about 25%, preferably less than about 20% of said margin, (v) wherein the free areas in said margin comprise at least about 50%, preferably at least about 75% of their original thickness, and (vi) wherein the fabric maintains greater than 50%, preferably at least about 75%, preferably at least about 90% of its overall original thickness.

Preferably, on the surface on which heat is applied the fused areas are depressed and surrounded by gradually and progressively less fused rising peripheries without precipitously changing thickness within the stabilized margin, and the depressed fused areas preferably protrude under an opposite surface of the fabric.

The inventive stabilizing method preferably utilizes projections with rounded tips to avoid abrupt changes of thickness around the depressed fused areas and to produce a molded edge or a molded fabric as opposed to a spot-melted edge or fabric. The three-dimensional shaping helps protect the thermoplastic surface fibers or yarns at the transition from melted to un-melted from being abraded away from the fabric. In other words, the transition from melted to un-melted should be gradual. In one alternative, the stabilization can optionally extend over the entire fabric. The fabric can be cut to form wipes, towels, or parts of garments before, during, or after the inventive stabilizing method.

The fusible component may comprise a pattern of stitch-bonded yarns entering and exiting the fabric with a repeating pattern having a first directional frequency and a second cross-directional frequency, and a pattern of the discrete fused areas engages the stitch-bonded yarns in each direction within a distance preferably smaller than the distance between two consecutive yarn insertion points. Fused patterns with the shorter spans between fused areas are useful in preventing substantial deterioration with use or washing and drying but less preferable.

The stitch-bonded fabric is optionally or preferably bulked prior to the intermittently fusing step by using heat to shrink some of the stitching yarns or a shrinkable layer included in the stitch-bonded substrate.

The intermittently fusing step preferably and optionally starts at the cut edges and gradually diminishes away from the cut edges within said margin. Preferably, the margin is larger than a thickness of the fabric.

The fusible component may comprise a secondary, low melting, added fusible component and higher melting fusible component present, wherein the fusing temperature of the secondary, added fusible component is lower than the fusing temperature of the higher melting fusible component. The higher melting fusible component may comprise yarns present in the fabric or yarns that are stitch-bonded into the fabric.

The intermittently fusing step may comprise the step of using rollers to fuse each cut edge separately. Alternatively, the intermittently fusing step may comprise the step of using flat dies to stabilize multiple cut edges substantially at the same time. Alternatively, the intermittently fusing step may comprise the step of using rollers to stabilize all four edges or the entire fabric substantially at the same time. The stabilization may be confined to the precut edges and/or the margin by localizing the pattern of projections on the heated roll or plate, or it may utilize raised patterns of an elastically compressible anvil surface against a uniformly patterned heated roller to stabilize substantially the entire surface of the fabric. The roller or die may simultaneously cut the fabric into towels. Optionally, at least one of the cut edges is scalloped.

The intermittently fusing step may utilize projections aligned or staggered within said margin or throughout the fabric. The projections may be taller than a thickness of the fabric. Preferably an elastically compressible anvil surface supports the fabric and allows the fabric to be molded on one or both surfaces during the intermittently fusing step, further allowing the stabilization process to increase overall fabric thickness without perforating the fabric.

The inventive process may further comprise the step of washing and drying the fabric to recover at least about 50%, preferably about 75% more preferably at least 90% of its original thickness.

The secondary, lower melting added fusible polymeric material may be added to said margin prior to the intermittently fusing step. The added fusible material may comprise a low-melting powder or net, a polymeric dispersion or a nonwoven layer. The margin is optionally pre-heated before the intermittently fusing step.

The fabric may contain at least 5%, preferably 10%, most preferably at least 25% of total fusible materials, including the secondary, low melting added fusible material. Preferably, the total amount of fusible materials is less than about 33% of the weight of the fabric.

Another embodiment of the present invention relates to a fabric comprising containing at least about 45%, preferably at least about 55%, preferably at least about 70% and less than about 90% cellulosic or natural component/fibers, and a secondary, lower-melting, fusible component, wherein the fusible component is located at least within a stabilizing zone extending proximately from a portion of a periphery of the fabric inward, preferably extending proximately from substantially all of the periphery inward, (i) wherein the fusible component is activatable by heat and/or pressure and wherein a plurality of discrete, compacted segments of the fusible component is activated within said segments, (ii) wherein the discrete, compacted segments are substantially parallel or substantially orthogonal to the periphery or making an angle with the periphery, (iii) wherein the fusible component is a heat activated material applied at least to the stabilizing zone and/or is a thermoplastic yarn stitched at least to the stabilizing zone, (iv) wherein the stabilizing zone optionally extends over substantially the entire surface of the fabric, (v) wherein the discrete compact segments comprise less than about 33%, preferably less than about 30%, preferably less than about 25%, preferably less than about 20% of a surface area of said stabilizing zone, and (vi) preferably, the discrete, compacted segments comprise linear segments and separated spots of various shapes, surrounded by gradually rising peripheries and diminishing fusing as the fabric returns to full thickness in the stabilizing zone.

In one preferred embodiment, the inventive fabric comprises a web made from substantially all natural or cellulosic fibers and either stitch-bonded with thermoplastic, fusible yarns or having fusible material/fibers applied to the surface of the web. A stabilizing zone/margin, as described above and herewithin, is formed on the web to minimize unraveling of the edges of the fabric.

BRIEF DESCRIPTION OF THE DRAWINGS

In the accompanying drawings, which form a part of the specification and are to be read in conjunction therewith and in which like reference numerals are used to indicate like parts in the various views. The dimensions provided in some of the figures are only exemplary and are to be understood as examples of the inventive fabrics or methods of making the fabrics. The present invention is not limited to any dimensions from the drawings or from the specification.

FIG. 13b is a schematic cross-sectional view of the of the stabilized fabric shown in FIG. 13a.

FIG. 15b is a schematic cross-sectional view of the stabilized fabric of FIG. 15a.

DETAILED DESCRIPTION OF THE PREFERRED EMBODIMENTS

Figure 1:
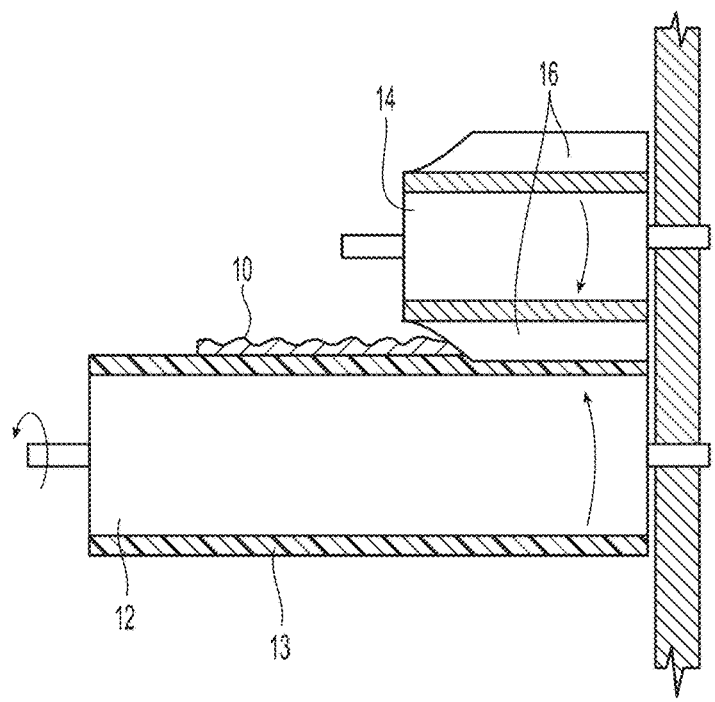
FIG. 1 is a schematic cross-sectional end view of an edge sealing drum equipped with slanted radial edge slats running over an edge of a fabric against an opposing support drum surface to form cross-directional embossed lines with a variable depth, along a longitudinal cut edge of the fabric.

A generalized embodiment of the present invention is directed to a predominantly cellulosic or natural fiber fabric that includes thermoplastic polymeric and/or fusible material locally melted or fused with heat and pressure at least along the cut or slit edges, and alternatively or preferably throughout the surface of the fabric, with heated projections spaced at intervals fusing the thermoplastic components. This inventive process leaves the cellulosic or natural fibers located within the fused areas intact. The stabilized fabric unexpectedly does not lose significant thickness or overall bulk or absorbency or softness, because of the relatively large spacings between embossed, fused or depressed areas in the stabilized zone and the resilience and heat resistance of the high cellulosic content. The thermoplastic fibers/fusible material contained within the fused areas is chosen to sufficiently prevent the cut edges from unraveling or disintegrating with use or with washing and drying. The fabric maintains most of its original bulk or thickness, and absorbency. The fabric also maintains its original softness or regains it after a single wash and dry cycle.

In some embodiments, relatively high pressure is required to cause the locally fused material to flow further. In these embodiments an elastically compressible "anvil surface" is used to allow the fabric to conform, and remain conformed with the central zone of the fused depressions and the peripheries of the depressions, gradually rising to the original height. The embossing depth could exceed the original thickness of the fabric creating a textured or wavy 3-D surface on both faces of the fabric. The process is preferably performed at higher pressures and relatively lower temperatures to achieve stability without excessive melting of the surface fibers, and without oxidizing or yellowing the absorbent substrate. Embossing may be confined to one or more rectilinear or curvilinear, or scalloped cut edges, or it may be performed on all cut edges, or it may extend throughout the entire fabric surface, with a uniform or a variable pattern. The overall thickness, bulk and absorbent capacity of the original fabric is preferably preserved within at least 75% and preferably within at least 90% of the fabric.

In another embodiment, the embossed projections, e.g., pins, protrusions or slats also decrease in depth with distance away from the cut edges, thereby applying maximum heat and pressure proximate to the cut or slit edge, and gradually decreasing pressure away from the edges until the edge area is no longer embossed. In one embodiment, the projections contacting the fabric are discrete, spaced apart or discontinuous, alternating from elevated to depressed. In other embodiments, the projections consist of staggered slats or pins. The inventive methods and fabrics avoid bending stiffness, loss of drape, harsh or stiff areas, and undesirable precipitous, abrupt change of thickness neither around the partially fused depressions nor along the transitions from stabilized edges to non-stabilized inner areas.

In one embodiment the fabric contains more than 45%, preferably more than 55% and preferably more than 70% cellulosic or natural fibers. Preferably, the fabric contains less than about 90% cellulosic or natural fibers. Low melting/fusible powder, fibers, pulps or fibrids may be added to the fabrics. In one embodiment the fabric comprises substantially all cellulosic fibers, such as cotton or wool and has adhesive low-melting powder or fibers or pulps or fibrids added at the edges or throughout the surface of the fabric to facilitate stabilization. In some embodiments, the fabric is a highly or substantially all cellulosic substrate stitch-bonded with thermoplastic yarns forming segments exposed on the surface. A small amount of low-melt binder present among these segments embossed with a textured heated tool eliminates the need for the segments to be melted fused to each other. This addition eliminates the need for high temperatures or pressures to stabilize stitch-bonded yarn segments exposed on the surface of the fabric.

In some embodiments a low-melt layer, preferably constituting less than 5% of the overall weight of the fabric, such as a film, or a nonwoven fabric, or a scrim is contained within the fabric and activated during the embossing process.

The embossing projections, e.g., slats, protrusions or pins, can be mounted on a heated plate or they may be placed on the periphery of a heated drum or roller. The stabilization can be performed on one-edge-at-a-time fashion or simultaneously on multiple edges, or over the entire surface of the fabric. Stabilization can also be performed with appropriately shaped flat dies or embossing drums/rollers on cut-out shapes such as circular, elliptical or regular/irregular, or polygonal shapes intended for apparel applications.

In one embodiment, the fusible material added to the fabric preferably melts at a temperature lower than the melting temperature of the thermoplastic stitch-bonded yarns or thermoplastic fibers within the fabric and is preferably added before the application of heat and pressure. In another embodiment, fusible material is present or introduced throughout, or at least at the top and/or bottom surfaces of the fabric. In some embodiments, the added fusible material is in the form of a low-melt powder sifted-on or applied as a suspension or solution in a liquid. The added fusible material can also be a low-melting plastic net or in the form of low-melting dots or interrupted lines carried by an open net that may or may not itself be fusible with the applied pressure and heat. The applied heat and pressure are sufficiently high to activate the fusible materials and sufficiently low to allow the areas between the consolidated or embossed areas to recover from compression before or after washing and drying aided by the presence of a high percentage of cellulosic materials that do not fuse with the applied heat. In one embodiment, the applied pressure gradually diminishes starting from the cut or slit edge toward the interior of the fabric.

The slit or cut edges may be rectilinear. Alternatively, the slit or cut may be curvilinear, scalloped or irregular. In one embodiment, the slitting or cutting is performed all around a regular peripheral shape as exemplified by a wipe or towel, or on a variously shaped part of a garment using cutting dies equipped with appropriate embossing projections.

In one embodiment, the edge stabilization is performed with uniform heat and with linearly or gradually diminishing pressure as the pressing tool opens away from the slit or cut edges resulting in gradually diminishing compaction. In other embodiments, gradual compaction diminishing away from the cut edge is achieved by using embossing tools with a uniform pattern of projections heated from the outer edge, resulting in a temperature gradient decreasing inward. The stabilization of the edges may optionally be performed during slitting. Alternatively, the stabilization is performed after slitting.

In selected embodiments, the product is a stitch-bonded fabric processed as-stitched or after shrinking and bulking by activating a heat shrinkable yarn system or a separate heat-shrinkable substrate sublayer included in the original fabric.

The entire fabric or only the edges that need stabilization may optionally be pre-heated and the embossing tool can be heated, cooled, or unheated to set the preheated adhesive as it makes contact. Preferably, the compressed depressions are fused with peripheries gradually becoming less bonded as they reach the surrounding area unaffected by the applied heat.

Figure 2:
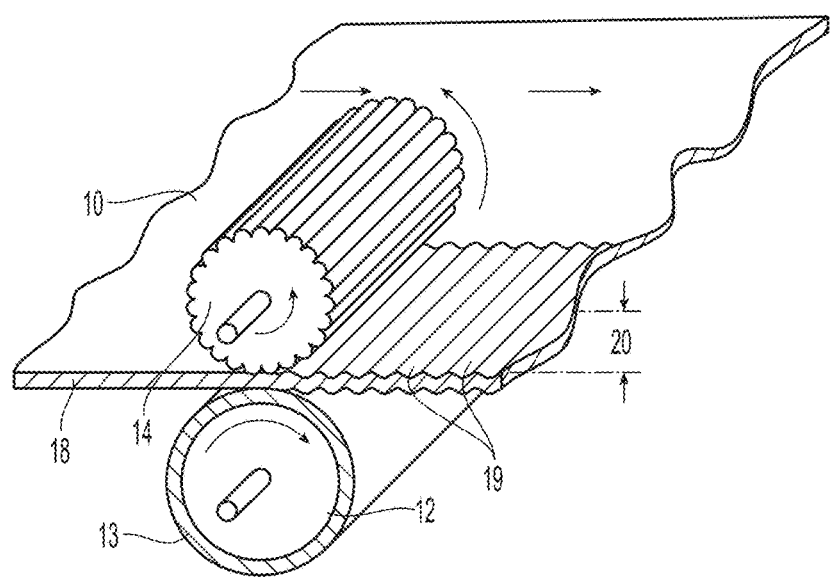
FIG. 2 is a schematic perspective end view of the fabric as it is emerging from the drums of FIG. 1 with a stabilized margin along a longitudinal cut edge, wherein the opposing support drum contains a deformable or elastically compressible surface allowing deep three-dimensional embossing, preferably detectable on the opposite face.

Referring to FIGS. 1 and 2, an individual longitudinal edge is stabilized as an absorbent fabric 10 advances between a support or anvil drum 12 and an edge sealing drum 14, which includes but is not limited to an embossing tool. Drums 12 and 14 rotate in opposite directions, e.g., clockwise and counterclockwise, as illustrated, to advance fabric 10 through said drums. In one embodiment, edge sealing drum 14 comprises upstanding projections 16 with rounded tips, which can be linear slats as shown, or projections or dots of various shapes. Drums 12 preferably have an elastically compressible surface to facilitate gradual compression and heat transfer and to gradually decrease the compression around the depressed, embossed areas. Optionally, anvil drum 12 has a relatively deep outer layer 13 of elastically compressible material such as silicon rubber, allowing larger embossing depths, including embossing beyond the bottom of the fabric, to create a three-dimensional surface on both fabric faces, as shown in FIGS. 1 and 2, and also in FIG. 3.

Figure 3:
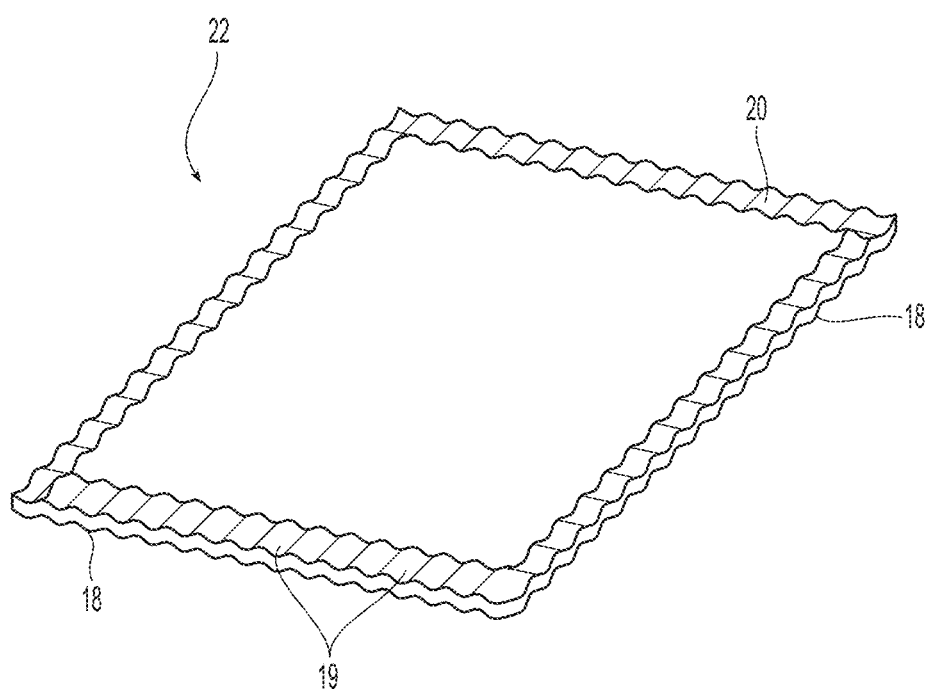
FIG. 3 is a schematic perspective view of a rectangular sheet that has been stabilized on all four cut edges by embossing the edges with the pattern and manner illustrated in FIG. 2.

Preferably and optionally, as shown in FIGS. 1 and 4-6, projections 16 have tapering heights decreasing away from cut edge 18 to allow the gradual reduction of embossing depth inward within stabilized zone 20. As described further below, stabilized zone 20 may also extend to include the entire surface of the fabric, making it unnecessary to slant the projections at the edges. As best shown in FIGS. 2 and 3, stabilized zone 20 comprises a plurality of embossed or compressed lines 19 made by projections or slats 16.

In one embodiment, absorbent fabric 10, which contains a significant amount cellulosic, cotton and other plant-based fibers to increase absorbency, is a web stitch-bonded with yarns, including thermoplastic yarns that add sufficient low-melt material so that when melted or embossed with heat and pressure fully stabilize or emboss stabilized zones 20 or the entire surface area of the fabric. Additional secondary, lower melting adhesive or fusible material may be applied to the web of fabric 10 prior to arriving at drums 12 and 14. In some embodiments, adhesive is applied primarily to stabilized zone 20. In other embodiments, the low-melt adhesive is included within the fabric, e.g., a film or scrim or nonwoven layer within the fabric. The adhesive can optionally be pre-heated and melted, before being embossed with a cold or cooled drum 14, and set by the cooling action of the drum. Added adhesive levels under 10%, and as low as 1-2% are sufficient to stabilize an edge or a fabric that is deeply embossed to the degree that the back surface has been impressed with the embossed pattern. This result is attributed to the protection provided at the depressed, fused areas to surface elements or yarns from the abrasive effect of end uses such as scrubbing and from the processes of washing and drying.

FIG. 2 shows the arrangement of FIG. 1 in perspective, wherein a thick deformable or elastic sleeve 13 on roll 12 allows the optional creation of a deeply embossed undulating cross section. FIG. 3 shows a rectangular fabric 22, e.g., a towel, stabilized sequentially and in turn on all four sides using the arrangement of FIGS. 1 and 2. When deformable sleeve 13 is omitted and stabilized edge 20 of fabric 10 remains substantially relatively flat after stabilization.

Figure 4:
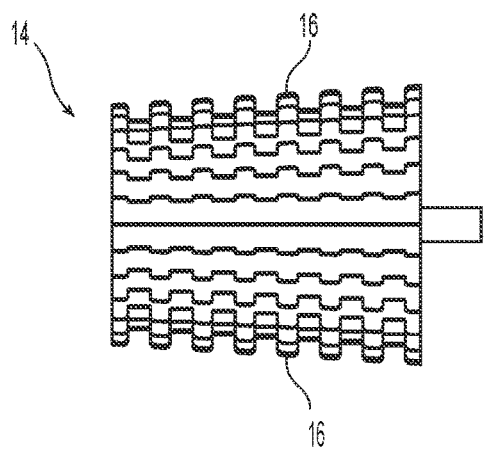
FIG. 4 is a schematic side view of another embodiment of an edge-sealing drum of the type of FIG. 1 with continually slanted and interrupted slats.
Figure 5:
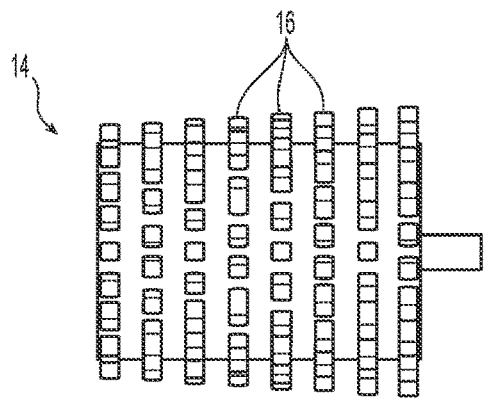
FIG. 5 is a schematic side view of another embodiment of an edge-sealing drum with interrupted upstanding slats staggered in the cross direction.
Figure 6:
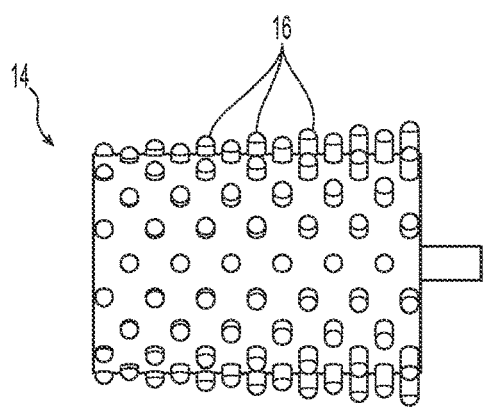
FIG. 6 is a schematic side view of another embodiment of an edge-sealing drum with round pins staggered in two directions.

Referring to FIG. 4, edge sealing drum 14 has interrupted linear projections 16 rounded at the tips and staggered in the cross-machine direction that also taper away from the fabric's cut edge 18. Drum 14 of FIG. 4 would produce stabilization zones of interrupted depressed or fused areas compacted with lesser amount of compression as the compacted segments move away from cut edge 18. FIG. 5 shows another edge sealing drum 14 similar to that illustrated in FIG. 4, except that projections 16 comprise discrete slat projections staggered in the machine cross-direction. FIG. 6 shows yet another edge sealing drum 14 similar to that illustrated in FIG. 5 with rounded circular projections 16 staggered in both machine and cross directions (MD and XD). The patterns of FIGS. 4, 5, and 6 are scaled and adjusted to provide stabilizing coverage to yarn or fiber patterns of different frequencies and dimensions, as explained in the Examples below, and illustrated by FIGS. 12-15 and their subparts.

Figure 7:
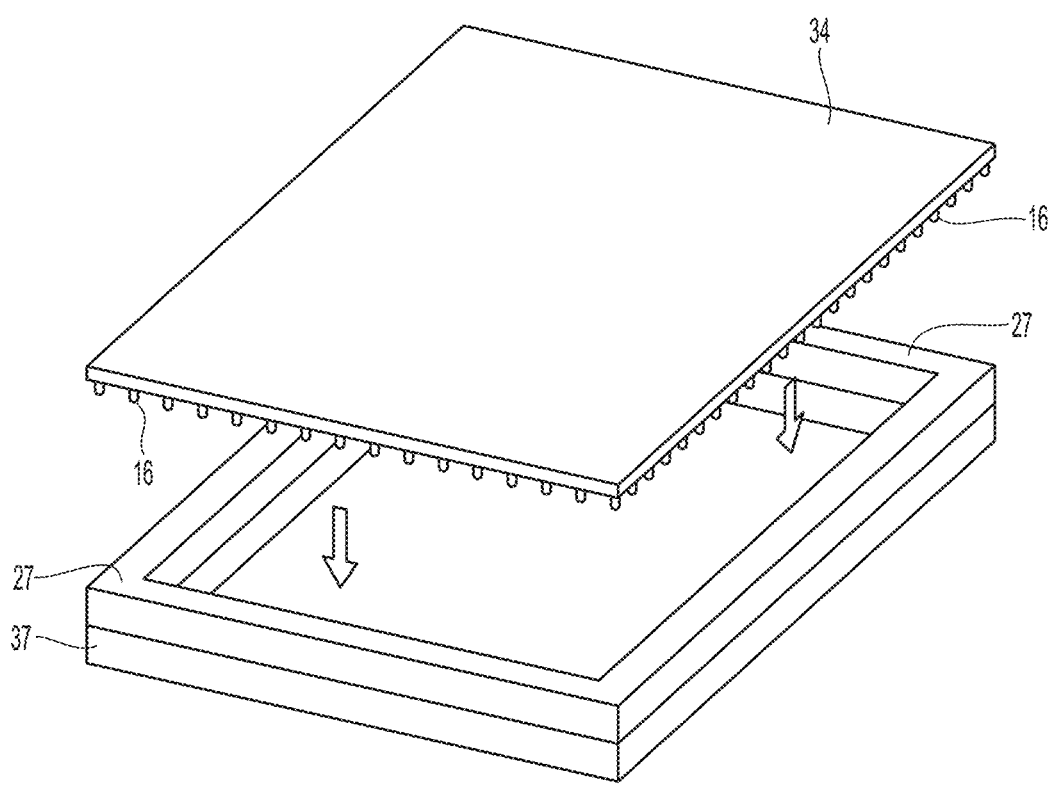
FIG. 7 is a schematic of a heated flat die used to stabilize all four edges substantially simultaneously by pressing against an anvil plate.

Referring to FIG. 7, in one embodiment a discrete absorbent fabric panel, such as a towel, is having its four edges stabilized at the same time using a flat heated pattern plate 34 pressed against a flat deformable and/or elastic anvil surface 27 supported with a stiffer plate 37. The anvil surface 27 may cover the entire area of the fabric or it may be present only along the edges, as shown, forming an embossed and stabilized periphery. The pre-cut fabrics may be cut from fabric 10 to be embossed by a heated flat die 34, or the fabric itself is pre-heated to be embossed by an unheated flat die 34 to activate the fusible or thermoplastic contents.

Figure 8:
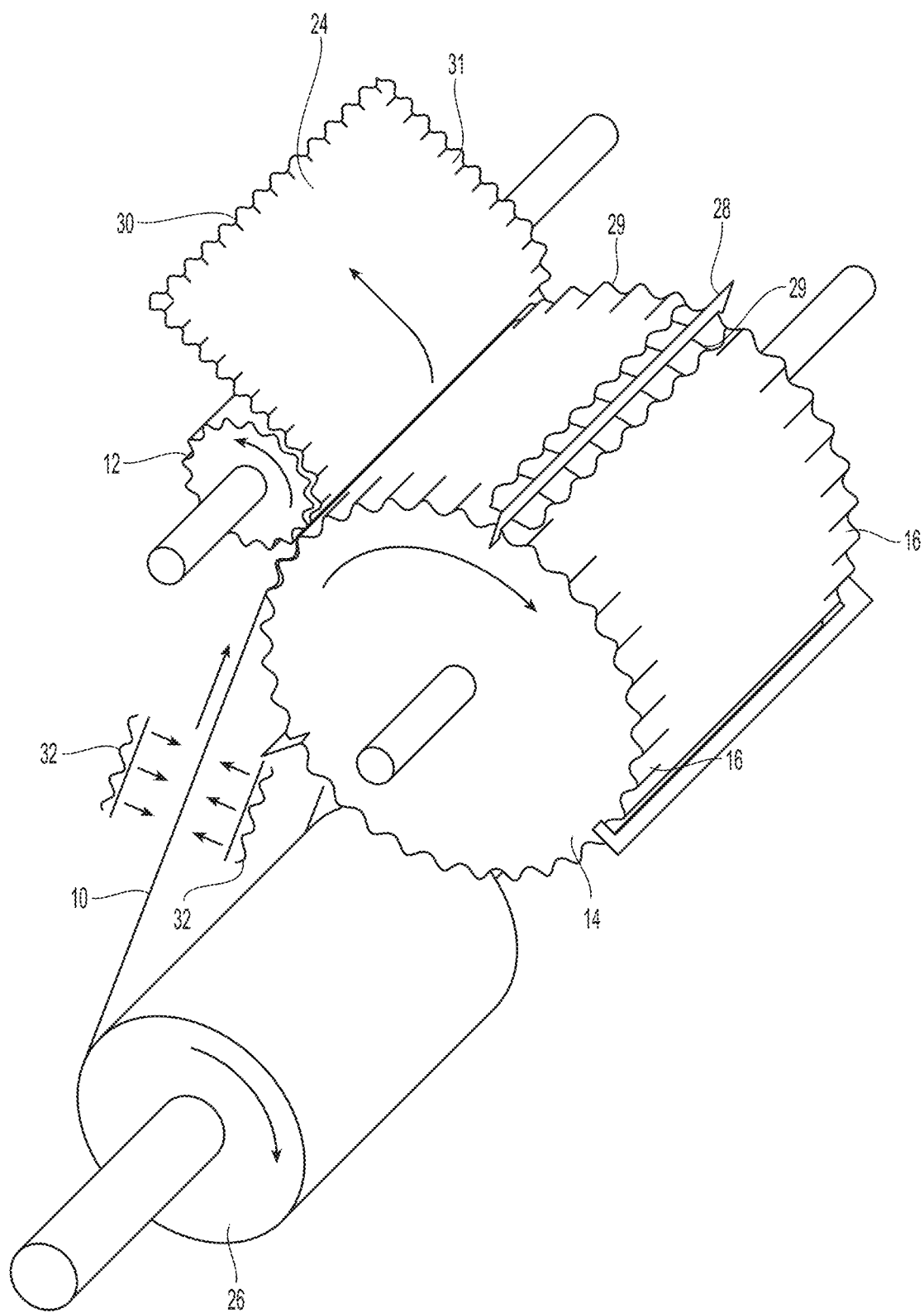
FIG. 8 is a schematic perspective view of a rotary edge sealing drum or rotary die used to emboss an edge-stabilizing pattern onto a sheet at all four edges and simultaneously cut individual rectangular panels.

In another embodiment, illustrated by FIG. 8, fabric(s) 10 can be stabilized simultaneously at all four sides with a continuous process replacing the batch or intermittent processes suggested by FIG. 7. As shown in FIG. 8, a long fabric 10 is kept on storage roll 26. Fabric 10 is pulled from storage roll 26 and advanced by the nip of edge sealing drum 14 and support or anvil drum 12. Differences between the embodiment illustrated in FIG. 8 and the one illustrated in FIGS. 1 and 2 include that the drums in FIG. 8 is sufficiently wide, and have a sufficiently large diameter and periphery to engage a full width of fabric 10 and the length of the cut-out panels/towels to stabilize all cut edges at the same time. Edge sealing drum 14 has projections 16 along its outside edges as shown. Optional knives 28 protrude from the surface of drum 14, and cut fabric 10 into multiple panels 24 when they oppose support or anvil drum 12. As shown, transverse projections/slats 29 are arranged on both sides of knives 28 to stabilize the longitudinal ends 30 of panels 24 as they are being cut from fabric 10, and longitudinal projections/slats 16 are arranged to stabilize the cross-edges 31. Edge sealing drum 14 functions as a rotary die, which is an alternative embodiment to flat die 24 of FIG. 7. Optionally, as shown, radiant heat or heated air or steam 32 and/or 33 can also be applied to fabric 10 to bulk up and/or gather fabric 10 before it reaches drums 12 and 14 with or without pre-melting the low-melting elements of the fabric.

Figure 9:
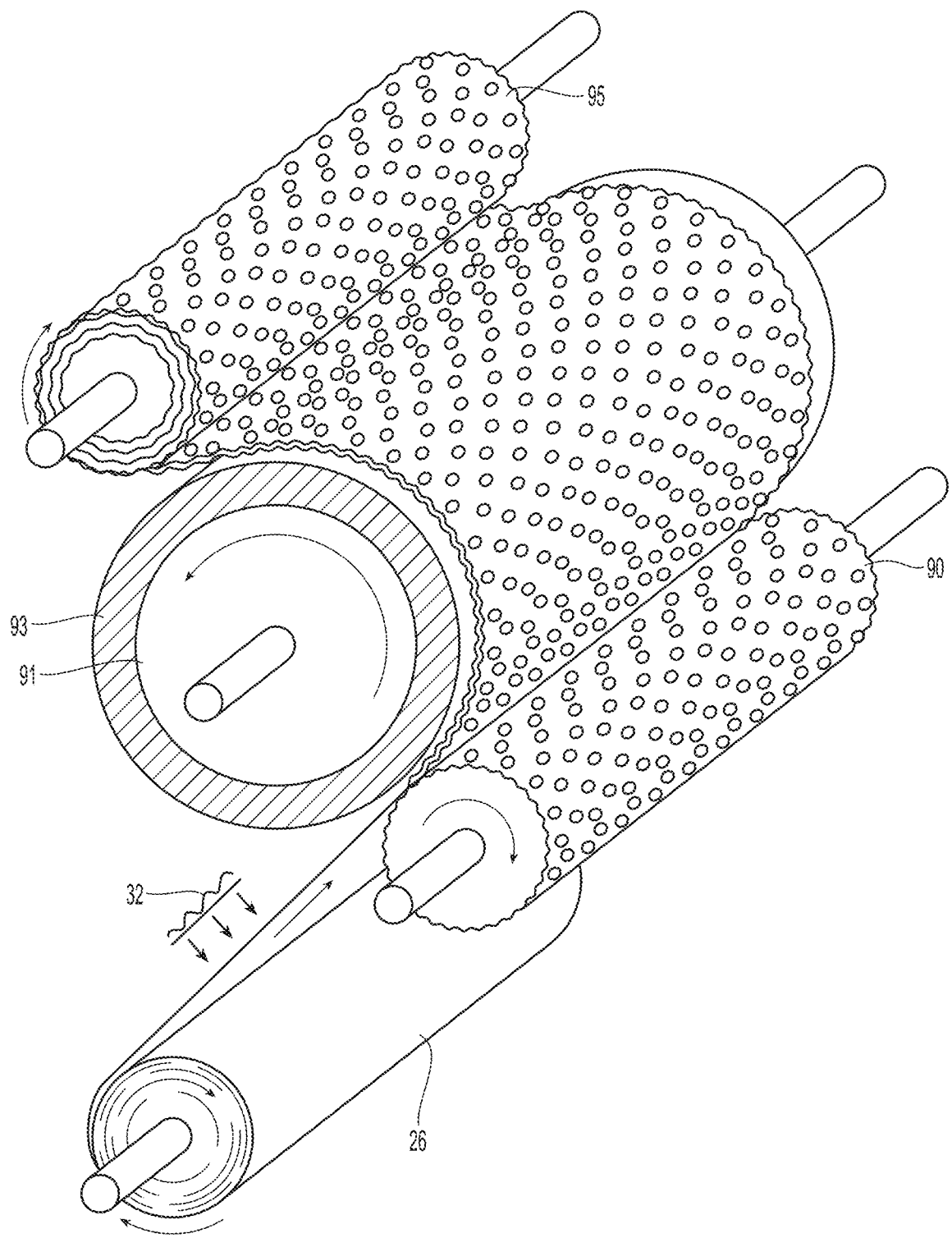
FIG. 9 is a schematic perspective view of a rotary embossing drum set against a soft elastically compressible roller to emboss and simultaneously fuse thermoplastic or fusible elements within the compacted areas of a fabric.

Referring to FIG. 9, a continuous process for stabilizing the entire surface of a primarily cellulosic fabric described above suitable to be cut or slit into any shape is shown. Patterned roll 90 is heated and pressed against anvil roll 91. Roll 91 is optionally preferably covered with a relatively soft elastically compressible sleeve 93 to allow deep embossing. The patterned projections on roll 90 are sized and arranged to stabilize the fabric without sacrificing bulk/thickness, absorbency or softness, as demonstrated in detail in the examples and FIGS. 12-15 and their subparts. The guiding principle is to provide bonding and/or fusing at discrete points or lines or areas that engage unsecured yarns or fibers that enter and leave the fabric surfaces, with the fused, depressed areas protected from abrasion as they remain lowered under the surrounding areas during use or washing and drying, and furthermore to avoid precipitous melted peripheral transition from the fused depressions to the non-fused peripheries. The embossing projections of roll 90 are preferably rounded at their tips and deployed with a frequency exceeding one half of the frequency of yarn insertion and emergence, and consequently limit unraveling at cut edges of any shape to less than two intervals, simultaneously preserving local softness, absorbency and thickness/bulk. The stabilized fabric is taken up by roll 95.

Figure 9A:
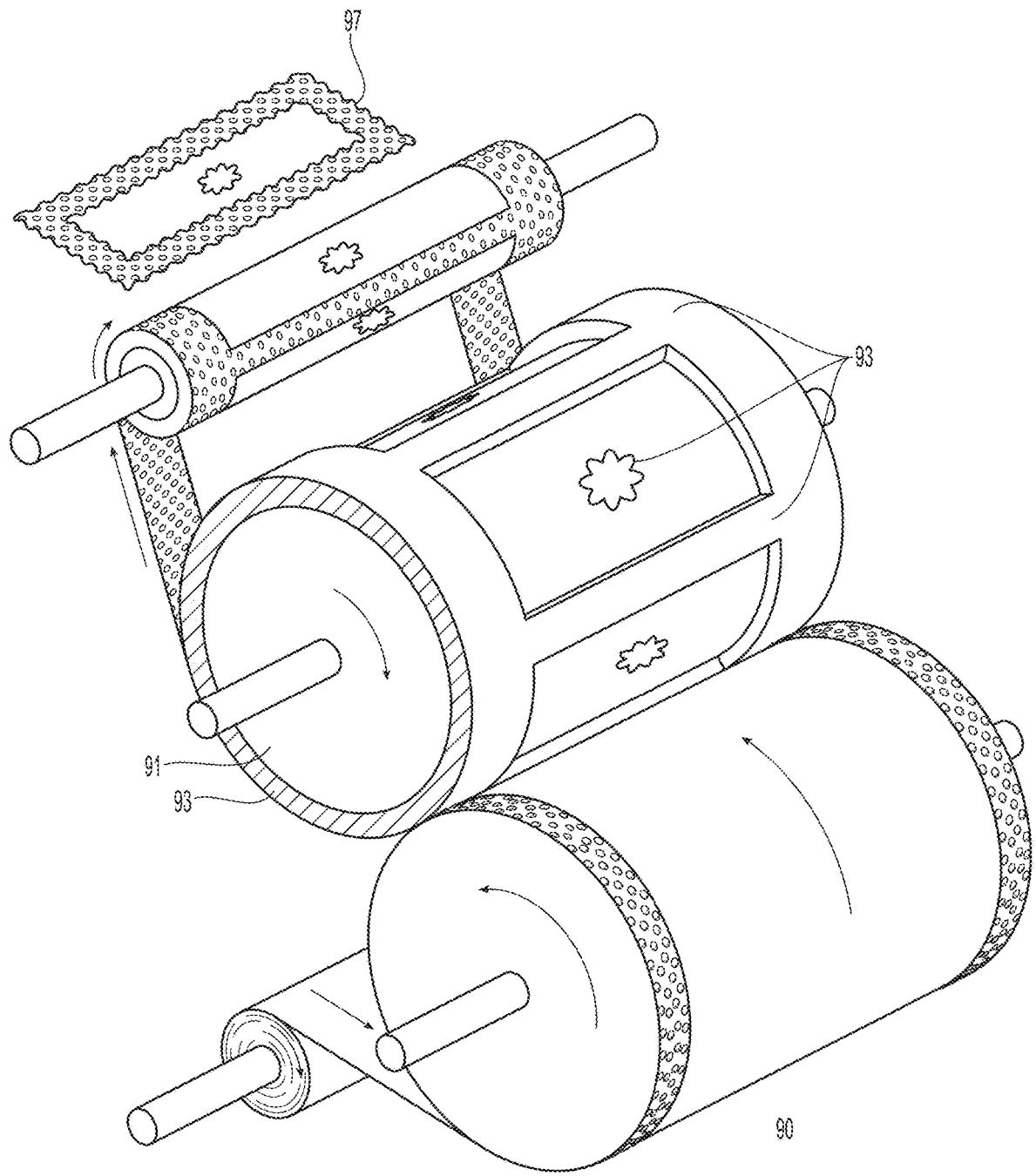
FIG. 9A is a schematic view of the type of equipment shown in FIG. 9 wherein the rollers have been placed in a position for the fabric to wrap around the heated embossing roll and preheat the incoming fabric, and wherein the anvil roll is modified to allow selective stabilization of selected areas by removing parts of the compressible elastic layer on the anvil roller.

The arrangement of FIG. 9 can be varied to facilitate preheating the preferred surface contacting the heated roll 90 by providing a longer dwell against the roll with extended angle of contact, as illustrated in FIG. 9a. Preferably, the heated pattern roll has a larger diameter to increase preheat and allow high processing speeds.

The arrangement of FIG. 9a may also be advantageously modified to produce variations of the embossed areas without redesigning the surface pattern of heated roll 90, by providing elastically compressible elevated areas on anvil drum 91, wherein elastically compressible or pliable layer 93 is discontinuous and only present in shapes such as the frames around a towel, decorative stripes, etc. The same interrupted anvil areas can also be used in the arrangement of FIG. 9. A decorative towel, such as towel 97, may be slit or cut form the roll of finished product, as shown. Roller 90 may have projections positioned throughout its surface or only on certain portions thereof. An advantage of the embodiment of FIG. 9a is that an elastically compressible or pliable anvil layer 93 is less expensive than an anvil drum, and a set of pliable anvil layer 93 can be prepared with different designs for a single anvil drum. Furthermore, the surface portions of the pliable anvil layer 93 near the cut edges can be slanted downward inward to provide gradually diminishing embossing instead of using the slanted projections shown in FIGS. 1, and 4-6.

Figure 10:
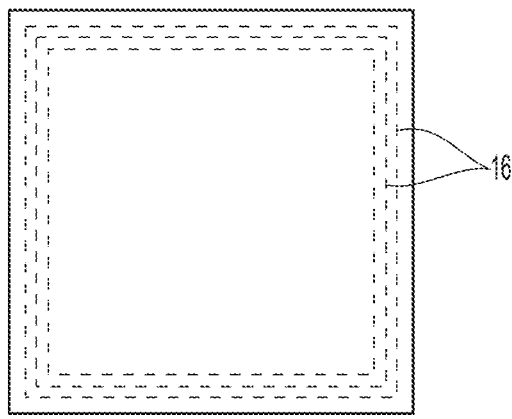
FIG. 10 is a schematic pattern of interrupted, staggered embossing lines running parallel to the edges of a rectangular absorbent towel.
Figure 11:
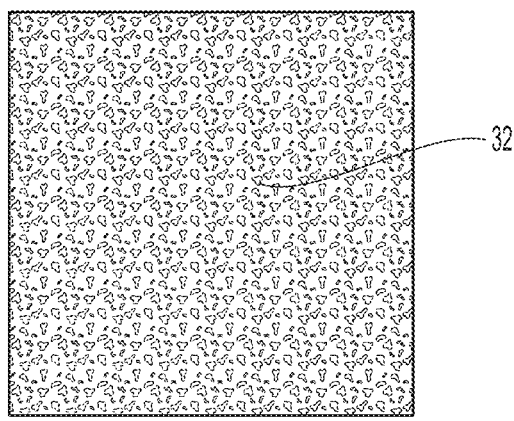
FIG. 11 is a schematic of an embossing pattern extending into the interior area of a fabric with a variable design.

FIG. 10 illustrates a pattern that may be produced with a flat die or with the arrangement of FIG. 9 or 9a, that comprises interrupted and staggered projections 16 that are substantially parallel to the cut edges. As shown, the parallel projections comprise three staggered lines of projections 16. Further designs may also have interior projections 32 to emboss the inside of the cut-out fabric with a variety of patterns as illustrated in FIG. 11, which may also take advantage of the technique of interrupted anvil surface of FIG. 9a.

EXAMPLES

The following examples illustrate but do not limit the scope of the present invention. All inventive examples were tested with 24 cycles of washing and drying without deterioration at the cut edges beyond one or two yarn insertion repetitions, and mostly without any clearly visible deterioration.

Group I. Stabilization Using High-Temperature/Moderate-Pressure to Fuse Face Yarns Stitch-bonded absorbent fabric using a 2 oz/yd$^2$ spunlaced cellulosic lyocell staple nonwoven layer placed under a composite spunlaced 70% wood pulp/30% polyester composite spunlaced nonwoven.

FIGS. 12-15 and their subparts show the technical back of the fabric with the more critical stitch underlaps 100 and 101 sinking into and emerging from insertion points 102, going across two spaces as they reciprocate. The linear stitch underlaps interconnecting all stitches on the opposite face are not shown.

The overlaid substrates are stitched with a 10-23/23-10 pattern using two bars deploying "two-over" opposing tricot stitches. The first bar, marked 100 on the underlaps in FIGS. 12-15 and their subparts, used polyethylene terephthalate 75 dpf (PET) textured polyester. The second bar, marked 101, used 75 dpf textured nylon, at 14 gage/10 cpi.

The overall cellulosic (lyocell and pulp) content was calculated at 62%, and fusible content at 38% (nylon and PET stitching yarns, plus the PET staple layer within the wood pulp/polyester nonwoven).

The stitched fabric was shrunk with heat approximately 15% in the machine direction (MD) and 5% in the transverse direction (XD). As shown in FIGS. 12-15 and their subparts, the final wales were approximately 0.067 inches wide, and each set of underlaps 100 bridged across two wales over 0.134 inches, as they repeated every 0.85 inches in the longitudinal direction. The shrunk and bulked fabric thickness was approximately 0.060 inches or 60 mils.

The underlaps 100 and 101 at the technical back were highly exposed and subject to unraveling, especially at the leading cross-cut edges.

Edges unraveled after one wash cycle, especially severely across the leading cross-cut edges.

Unless indicated otherwise, this fabric is utilized in the comparative examples and inventive examples below.

Conventional Attempts to Stabilize by Uniform Hot Pressing

Comparative P-1

Pressed lightly with flat iron heated to 240° C., applied from the underlap side.

Underlaps randomly fused on treated surface, product compacted to 50 mils, recovered to 55 mils after washing/drying (8-9% loss).

Fabric remained stiff; edges started unraveling further than several stiches after 2-3 washes.

Comparative P-2

Same as P-1 except with increased ironing pressure.

Compacted to 38 mils, recovered to 48 mils after washing (20% loss).

Some unraveling after 5-10 washes and noticeably stiffer than untreated fabric even after 24 washes.

Comparative P-3

Ironed with maximum hand pressure at 240° C.

Compacted to 28 mils, recovered to 40 mils after washing (33% loss).

Did not unravel, but stayed stiff and thin after 24 washes.

Example 1. Edge Stabilization with Parallel Lines Applied to Technical Back, Against Cross-Cut Edge (FIGS. 12*a*, 12*b*)

Same stitch-bonded fabric as comparative P-1 to P-3.

Figure 12A:
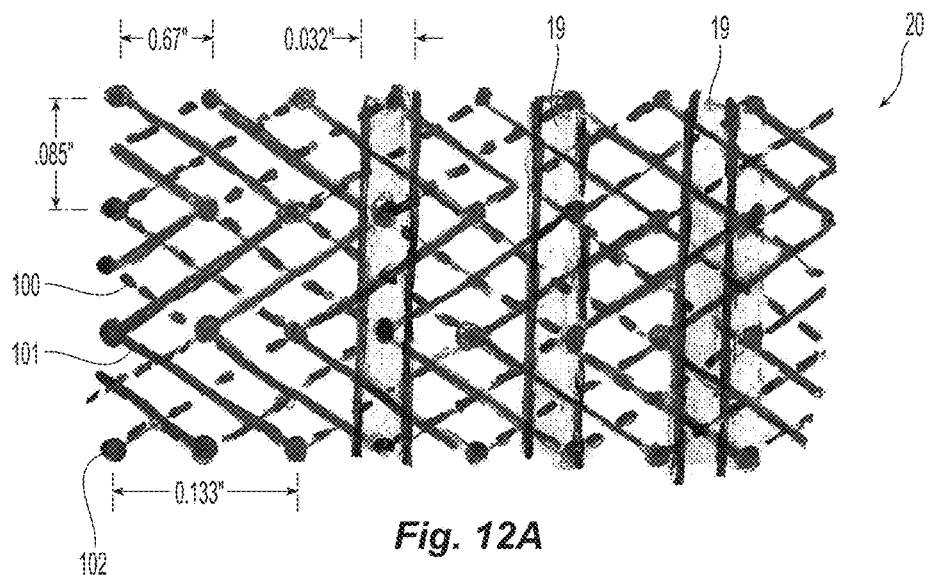
FIG. 12a is a schematic representation of a pattern of embossed parallel fused lines partially covering a stabilized area of the type of fabrics shown in FIGS. 1, 2, 7 and 8. Heat and pressure are applied against the underlaps along a cross-directionally cut edge to the technical back of a highly cellulosic fabric stitch-bonded with polymeric fusible yarns. The embossed/fused lines cover about 25% of the stabilized area, and are spaced at intervals smaller than twice the cross directional intervals with which the yarns forming the underlaps are inserted with a two-wale tricot pattern.
Figure 12B:
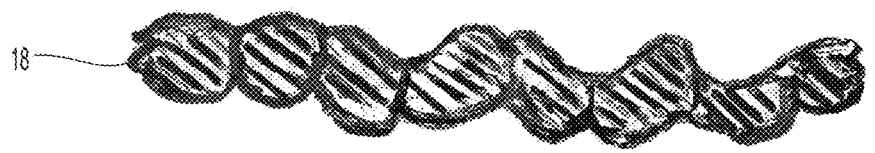
FIG. 12b is a schematic cross-sectional view of the fabric of FIG. 12a after stabilization.

Hand-embossed lines 19, along the cut fabric edges, with the fabric placed over a sheet of silicon rubber, using the tip of a soldering tool with a thickness "t" of approximately 0.32 inches, heated to approximately 240° C., pressed at intervals approximately every 0.125 inches, to a distance of approximately 0.380 inches in from the fabric edge, as illustrated in FIG. 12*a*.

Depth of emboss generally decreased from approximately 0.040 inches from the edge to zero within the stabilized borders or edge/margin 20.

Embossed and fused area within each 380-mil deep edge was approximately 25% of the total.

Within the embossed lines 19 the stitching yarn underlaps 100 and 101 lightly fused to each-other and pressed into the fabric under. The elevated areas around and beyond the impressions were approximately 0.55 inches thick.

The cross section of the fabric minimally changed as shown in FIG. 12*b*, although the compactions were perceptible on the opposite surface. The limited change was attributed to the resilience of the cellulosic components.

The edges remained stable and flat after 24 washings and dryings. Fabric softness at the edges was restored to the same level as the non-embossed remainder of the fabric after the first wash. Overall thickness within the stabilized edges after one wash returned to approximately 60 mils.

No edge-curling after laundering was observed.

Figure 12C:
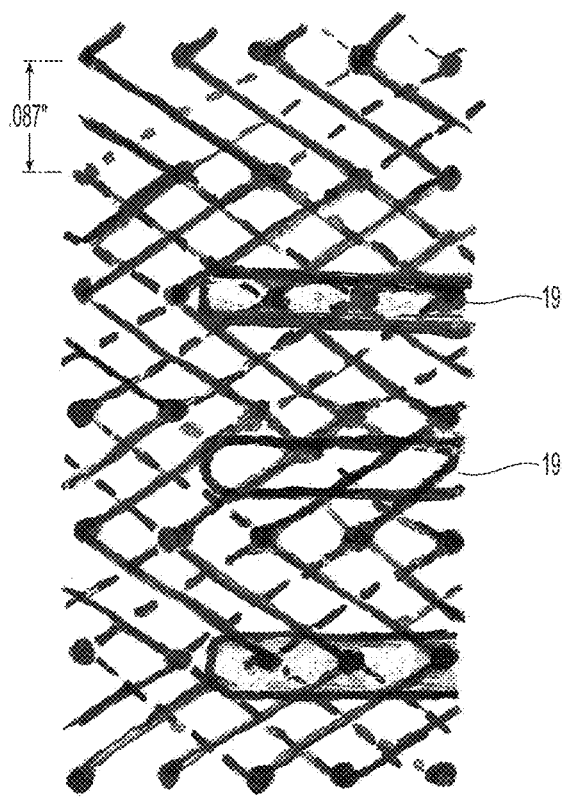
FIG. 12c is a schematic of the fabric of FIG. 12a wherein the embossed parallel fused lines have been embossed across a longitudinally cut edge.
Figure 12D:
FIG. 12d is a schematic cross-sectional view of the embossed edge shown in FIG. 12c.

Example 2. Edge Stabilization with Parallel Emboss Lines Applied Against a Longitudinally Cut-Edge (FIGS. 12*c*, 12*d*)

Same fabric and process as in Example 1.

Lines of emboss turned 90° and applied to the longitudinally cut edges.

Same results as in Example 1.

Example 3. Overall Stabilization with Cross-Oriented Staggered Lines (FIGS. 13*a*, 13*b*)

Same fabric and process as in Examples 1 and 2.

Figure 13A:
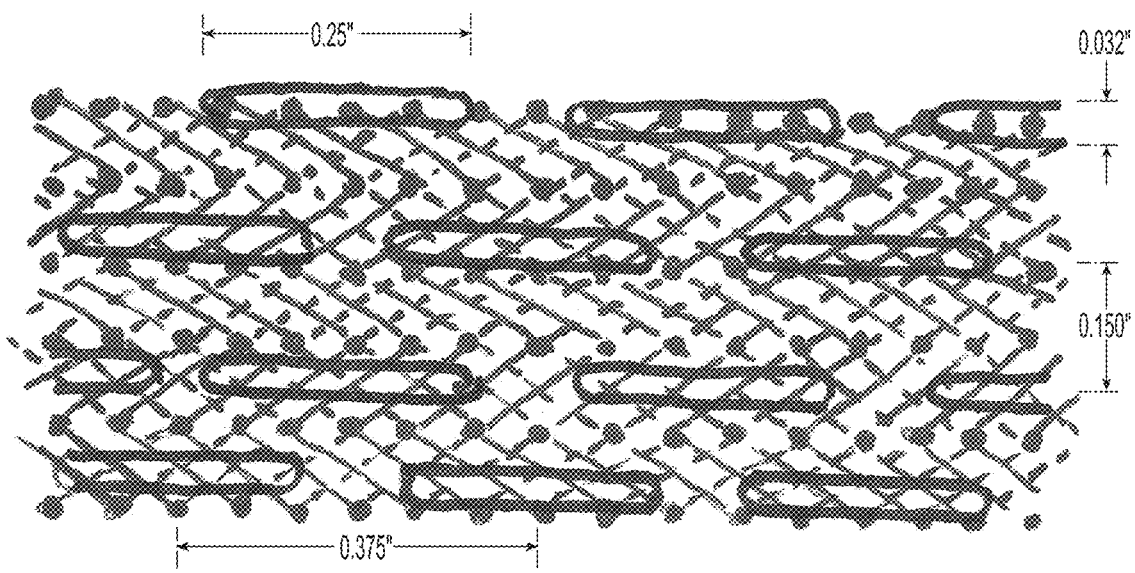
FIG. 13a is a schematic pattern of the fabric of FIGS. 12a-12d, stabilized throughout the surface of the stabilized area with a pattern of interrupted and staggered fused lines applied over the underlaps of the technical back face partially covering about 14% of the stabilized area.
Figure 13B:

Pattern of three staggered embossing lines, 0.150 inch or 150 mils apart, as shown in FIG. 13*a*, approximately ¹/₃₂-inch or 32 mils wide and ¼-inch or 250 mils long, spaced every ⅜ inch or 375 mils center-to-center, hand embossed onto the technical back by pressing over the underlaps Embossed area is approximately 14% of the total area shown, which could be the stabilized zone or margin 20 or the entire fabric surface.

Fabric, including cut edges, regained full softness after 1 wash, remained intact and flat after 24 washes.

Overall thickness returned to 60 mils after the first wash.

Washing/drying did not cause area warping or edge warping; attributed to the staggered arrangement, the three-dimensional embossing/molding, and the resilience of the high cellulosic content.

Figure 13C:
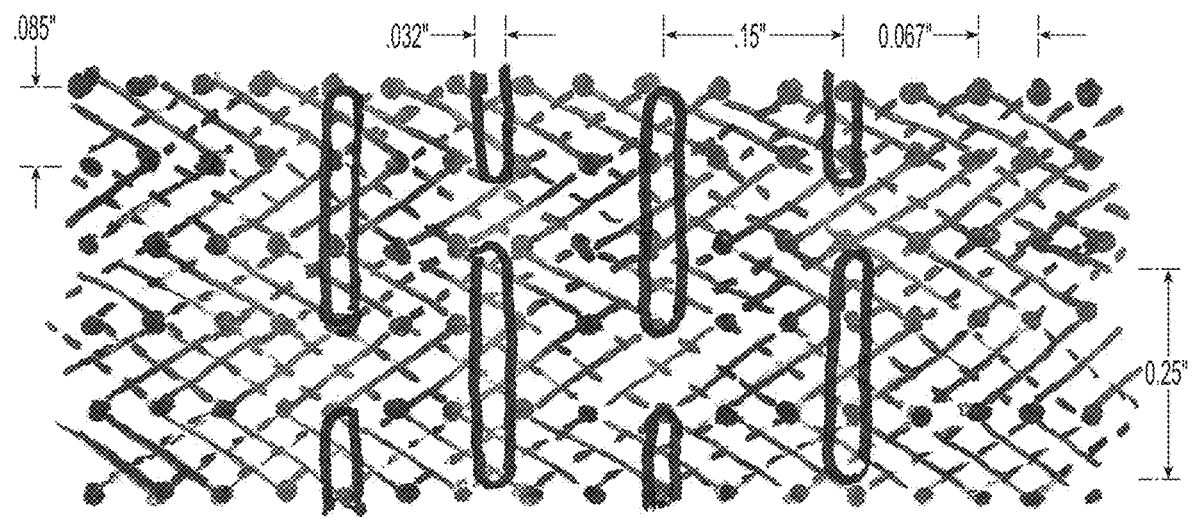
FIG. 13c is a schematic of the fabric of FIG. 13a stabilized with the pattern of the embossed parallel fused lines turned by about 90 degrees.
Figure 13D:
FIG. 13d is a schematic cross-sectional view of the stabilized fabric of FIG. 13c.

Example 4. Overall Stabilization with Longitudinally Oriented Staggered Lines. (FIGS. 13*c*, 13*d*)

Pattern of FIG. 13*a* was turned 90°.

Same process and results as in Example 3.

Figure 14A:
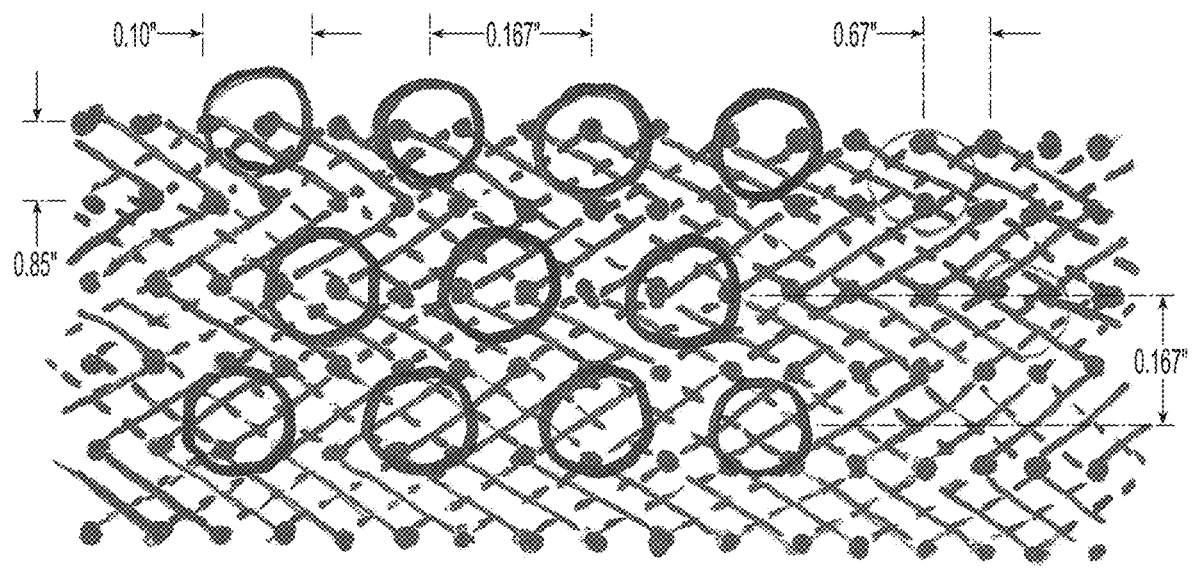
FIG. 14a is a schematic of the inventive fabric, wherein a staggered pattern of embossed circles, partially covering about 28% of the surface area, is applied to the technical back of the fabric against the underlaps.
Figure 14B:
FIG. 14b is a cross sectional view of the fabric of FIG. 14a wherein the embossing pattern is confined to the front surface.

Example 5. Overall Stabilization Using a Staggered Dot Pattern (FIGS. 14*a* and 14*b*)

Same fabric as in Examples 1 to 4.

Staggered dots pressed throughout the fabric with soldering tool rounded at the tip, heated to approximately 240° C. The embossed dots have diameters of approximately 100 mils or ³/₃₂-inch, repeating every ⅙ inch or 167 mils in both directions, as shown in FIG. 14*a*, preferably in a staggered manner.

Embossed area approximately 28% of total surface area.

Cross section assumed an undulating configuration, without losing overall bulk, as shown in FIG. 14*b*.

Cut edges 18 in any direction remained intact after 24 washes.

Thickness of fabric remained in an undulated configuration after the first wash.

No warping after washing and drying.

Example 5A. Overall Stabilization Using a Heated Calender, Lower Temperature and Higher Pressures (FIGS. 9a and 15)

Figure 15A:
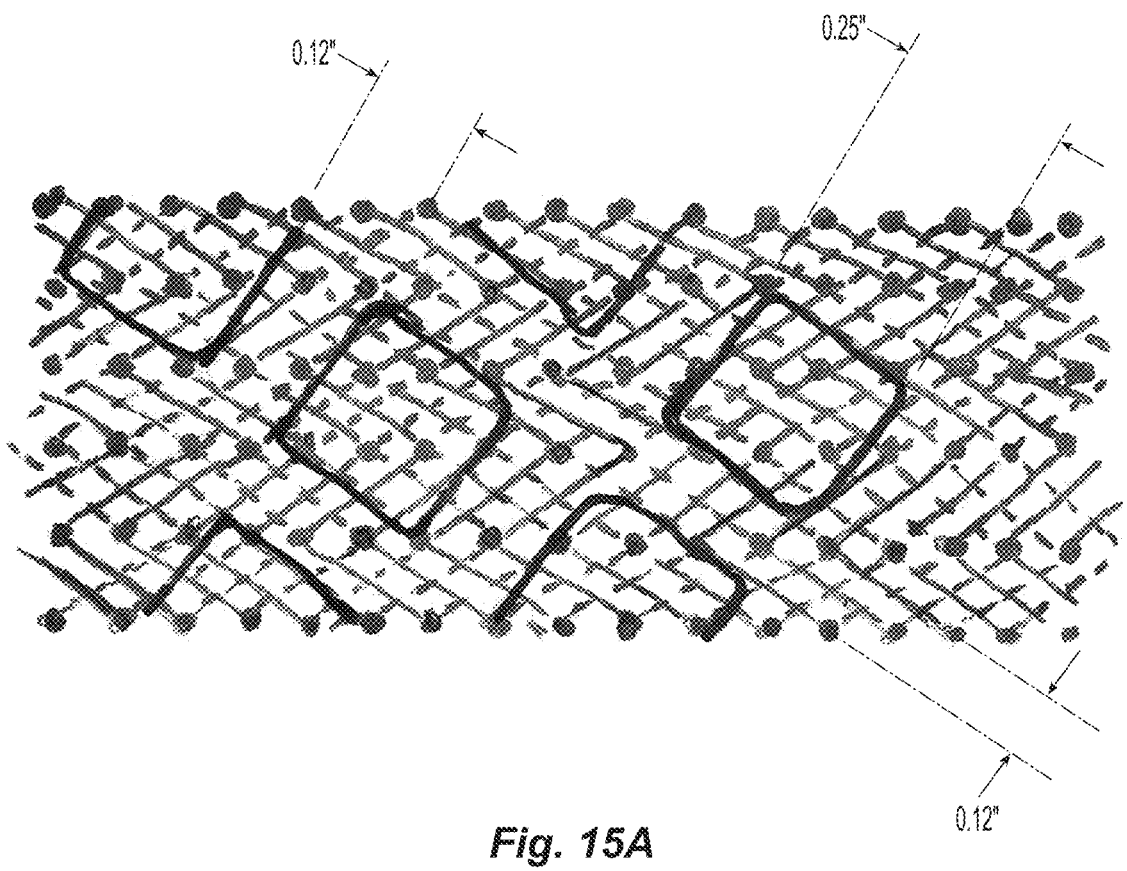
FIG. 15a is a schematic of a pattern of staggered larger embossed areas covering about 30% of the stabilized area applied to a stitch-bonded fabric using equipment similar to FIG. 9 to pre-heat the two-wale stitch underlaps and fuse them to allow stabilization of the fabric using higher pressures, at high speeds, without risking excessively high melting or yellowing, and without resorting to high roll surface temperatures, or radiant preheating.
Figure 15B:

A calender roll with a coarser pattern of projections shown in FIG. 15 was heated to a surface temperature of 205° C., and applied to the underlap side of the same fabric as described above, after wrapping halfway around the heated roll, in the manner shown in FIG. 9A. The roll projections were diagonally oriented at 45 degrees, measuring approximately 0.25 by 0.25 inches with rounded edges, and covering approximately 25% of the overall area.

With the lower temperature available fusing was not detected until pressure was gradually increased against the soft anvil surface until some fusing of the underlaps was detected while the edges of the depressions remained free of precipitous melting.

The fabric was stiffened because of the extensively large dimensions of the roll projections, but gained full softness and overall bulk after one wash dry cycle.

After 24 wash dry cycles only a few of the leading end of the underlaps had occasionally unraveled to a depth of approximately 100 to 150 mils or one or two stitch lengths from the leading cut edge It was also noted that the stabilizing patterns in FIGS. 12a, 13a, 14a and 15 cover about 26%, 14%, 18% and 25%, respectively of the stabilizing areas 20. These values are exemplary only, and do not limit the scope of the invention.

Group II. Stabilization Using Lower Temperatures and Added Low Melt Adhesive

Same fabric as in Examples 1-5A.

Comparative P-4

Added approximately 0.5 oz/yd$^2$ low melt polyester powder brushed into the technical back underlap surface.

Applied minimum hand pressure with flat iron heated to 160° C.

Fabric flattened to 50 mils, recovered to 55 mils after washing (8% loss), also recovered softness after one wash.

Cut edges unraveled after 3-5 wash cycles.

Comparative P-5

Same as P-4 except increased ironing pressure.

Fabric thickness reduced to 35 mils, recovered to 45 mils after washing (25% % loss).

No cut edge unraveling after 24 washes, but fabric very stiff.

Example 6. Edge Stabilization Combining Low-Melt Resin Within Cellulosic Fabric with Low-Temperature Embossing Using Staggered Dots A metal plate with the projection pattern shown in FIG. 14a heated to approximately 160° C. was pressed along the cut margins, approximately ½ inch in from the cut edges.

Cross section of embossed area similar to FIG. 14c, emboss pattern visible on top and bottom.

Fabric regained full softness and bulk after one wash; thickness steady around 60 mils Cut edges 18 remained flat and intact after 24 washes.

Example 7. Overall Stabilization Using Lower Temperatures and an Overall Uniform Embossing Pattern Same fabric and process as in Example 6 except embossing extended to the entire surface.

All cut edges stable and flat after 24 washes, including scallopped cuts, irrespective of direction.

While it is apparent that the illustrative embodiments of the invention disclosed herein fulfill the objectives stated above, it is appreciated that numerous modifications and other embodiments may be devised by those skilled in the art. One such modification is that low-melt adhesive is present within the yarns forming the fabric or stitch-bonded into the fabric. Another variation is that a portion of low-melt fibers or a portion of low-melt/high melt bicomponent fibers or intermixed within the cellulosic fibers are present within the fabric. Another variation is that emboss patterns are arranged with a mixture of embossing shapes to suit the fabric construction and adhesive distribution. Therefore, it will be understood that the appended claims are intended to cover all such modifications and embodiments, which would come within the spirit and scope of the present invention.

What is claimed is:

1. A process for stabilizing cut edges of an absorbent fabric containing at least about 45%, and less than about 90% cellulosic or natural component, and a fusible component present or added at least within a margin along the cut edges, comprising the steps of
    intermittently fusing said margin by applying heat and pressure to said margin to melt the fusible component in discrete fused areas extending at least along, across or at angle to the cut edges, and
    maintaining free areas between the discrete fused areas substantially free of fusing,
    wherein the fused areas transition in a sloping and progressively less fused periphery toward the free areas,
    wherein said margin optionally extend over substantially the entire surface of the fabric,
    wherein the discrete fused areas comprise less than about 33%, of said margin,
    wherein the free areas comprise at least about 50% of their original thickness, and
    wherein the fabric maintains greater than 50% of its overall original thickness.

2. The process of claim 1 wherein the fusible component comprises a pattern of stitch-bonded yarns entering and exiting the fabric with a repeating pattern having a first directional frequency and a second cross-directional frequency, and wherein a pattern of the discrete fused areas engages the stitchbonded yarns in each direction within a distance smaller than the distance between two consecutive yarn insertions.

3. The process of claim 1 wherein the intermittently fusing step starts at the cut edges and gradually diminishes away from the cut edges within said margin.

4. The process of claim 1 wherein the fusible component comprises low melting added fusible component and higher melting fusible component present and wherein the fusing temperature of the added fusible component is lower than the fusing temperature of the higher melting fusible component.

5. The process of claim 4 wherein the higher melting fusible component comprises yarns present in the fabric or yarns that are stitch-bonded into the fabric.

6. The process of claim 1 wherein a width of the margin is larger than a thickness of the fabric.

7. The process of claim 1, wherein the intermittently fusing step comprises the step of using heated rollers pressed against the fabric supported by a compressible anvil roller to fuse each cut edge separately.

8. The process of claim 1, wherein the intermittently fusing step comprises the step of using flat dies to stabilize multiple cut edges at the same time.

9. The process of claim 1, wherein the intermittently fusing step comprises the step of using a roller or a die to stabilize all four edges at the same time.

10. The process of claim 9, wherein the roller or die simultaneously cuts the fabric into towels.

11. The process of claim 1, wherein said margin is pre-heated.

12. The process of claim 1, wherein the fabric contains at least 10% polymeric fusible materials.

13. The process of claim 2, wherein the stitch-bonded fabric is bulked prior to the intermittently fusing step by using heat to shrink some of the stitching yarns or a shrinkable layer included in the stitch-bonded substrate.

14. The process of claim 1, wherein at least one of the cut edges is scalloped.

15. The process of claim 1, wherein the intermittently fusing step utilizes projections aligned or staggered within said margin.

16. The process of claim 15 wherein the projections penetrate beyond a thickness of the fabric.

17. The process of claim 16 wherein an elastically compressible anvil surface supports the fabric during the intermittently fusing step.

18. The process of claim 1, further comprising the step of washing and drying the fabric to recover at least about 50% of its original thickness.

19. The process of claim 1 wherein the fusible component is added to said margin prior to the intermittently fusing step.

20. The process of claim 19 wherein the added fusible component comprises at least one of a low-melting powder, a polymeric dispersion, a low-melting nonwoven layer or a low-melting net.

21. A fabric constructed in accordance to the process of claim 1.

22. The fabric of claim 21, wherein said discrete fused areas comprise linear segments, curvilinear segments or round spots.

23. The process of claim 1, wherein the discrete fused areas protrude through an opposite surface to create a three-dimensional effect in said margin.

* * * * *